(12) United States Patent
Eichstedt et al.

(10) Patent No.: US 6,315,242 B1
(45) Date of Patent: Nov. 13, 2001

(54) PROPULSION SYSTEM FOR A SEMI-BUOYANT VEHICLE WITH AN AERODYNAMIC

(75) Inventors: David B. Eichstedt, Lancaster; John P. Morehead, Santa Clarita; John B. Kalisz, Newhall, all of CA (US)

(73) Assignee: Lockheed Martin Corporation, Palmdale, CA (US)

( * ) Notice: Subject to any disclaimer, the term of this patent is extended or adjusted under 35 U.S.C. 154(b) by 0 days.

(21) Appl. No.: 09/467,967

(22) Filed: Dec. 21, 1999

(51) Int. Cl.$^7$ ................................................. B64B 1/02
(52) U.S. Cl. .................... 244/30; 244/25; 244/125
(58) Field of Search ............................... 244/5, 24, 25, 244/30, 29, 125

(56) References Cited

U.S. PATENT DOCUMENTS

| | | | |
|---|---|---|---|
| 4,450,364 | * | 5/1984 | Benoit ................................ 244/25 X |
| 4,773,617 | * | 9/1988 | McCampbell ........................ 244/24 |
| 5,071,090 | * | 12/1991 | Takahashi et al. .................. 244/29 |
| 5,090,637 | * | 2/1992 | Haunschild ....................... 244/24 X |

* cited by examiner

*Primary Examiner*—Robert P. Swiatek
(74) *Attorney, Agent, or Firm*—Robert A. Schruhl (57) ABSTRACT

A propulsion system for a non-rigid and at least semi-buoyant vehicle, the vehicle including a pressure stabilized gasbag having a gondola mounted on the bottom thereof. The gasbag further includes catenary curtains extending from the top of gasbag to the bottom of the gasbag and attached thereto. In detail, the propulsion system includes a first pair of tubular members attached, preferably pivotally attached, by one of their ends to the gondola and which extend through the air bag and exit out the top thereof and having propulsion units, preferably turbo-prop engines, attached to their opposite ends. A second pair of tubular members is attached by one of their ends to the gondola, preferably pivotally attached, and extends into the gasbag and having their opposite ends terminating therewithin. A horizontal tubular member extends through the gasbag and has its ends extending out of the sides thereof and is attached to the opposite ends of the second pair of tubular members in the middle thereof. The ends of the second pair of tubular members also have propulsion units attached thereto.

17 Claims, 14 Drawing Sheets

PROPULSION SYSTEM FOR A SEMI-BUOYANT VEHICLE WITH AN AERODYNAMIC

BACKGROUND OF THE INVENTION

1. Field of the Invention

The invention relates to the field of propulsion systems and, in particular, to a propulsion mounting system for a non-ridged, semi-buoyant vehicle.

2. Description of Related Art

There are basically two main types of fully lighter-than-air vehicles; the rigid type or as it is more commonly called the "dirigible" and the non-rigid type or "blimp". Blimps basically comprise a single or multi-number of non-rigid gasbags wherein internal inflation pressure is used to form the external shape of the vehicle. A typical example of this design is found in U.S. Pat. No. 4,265,418 "Elongated Inflatable Structures For Flying Device Bodies" by M. Eymard the shape of the vehicle. The other basic type of lighter-than-air vehicle is the ridged design wherein an internal support structure is covered with a flexible material that serves as the outer skin. The vehicle may consist of a single gas chamber wherein the outer skin serves as the "gasbag" or can have numerous internal gasbags. An example of this concept can be found in U.S. Pat. No. 4,591,112 "Vectored Thrust Airship" by F. N. Piasecki, et al. However, both examples require that they be simultaneously loaded and unloaded in order to prevent the vehicle from "flying off." In fact, such vehicles must be tethered when on the ground during such operations. A particular limitation of the non-ridged design is that the flight station and cargo compartment generally must be mounted on the gondola at the bottom of the vehicle. The gondola is typically supported by catenary cables or curtains attached to the top of the gasbag. The dirigible design allows most if not all these components to be mounted within the main body of the vehicle, although most all incorporate a gondola of some sort. However, when the vehicle is extremely large there costs become prohibitive because the complexity of the internal structure. A problem with both designs is that, as fuel is consumed, the vehicle becomes lighter. In order to compensate for this increase in weight ballonnet systems are used. These typically comprise smaller inflatable compartments within the Helium filled bags that can be filled with air displacing "Helium volume", and reducing lift. Systems to reclaim water in the exhaust are also incorporated.

These two examples are true lighter-than-air vehicles in that the gas filled balloon generates all the lift. However, having the external contour of the vehicle in an aerodynamic lift producing shape can reduce the overall size of such vehicles and generally cost, for any given payload. Such vehicles not totally buoyant and take off in a manner similar to a conventional aircraft. In such designs, it is common practice to use a rigid internal frame (the dirigible concept) in order to maintain the proper contour. For example U.S. Pat. No. 3,486,719 "Airship" by J. R., Fitzpatick, Jr. While the Fitzpatick, Jr. design uses a rigid skin; most use a flexible gasbag with an internal frame structure. Of course there are non-rigid designs such as disclosed in U.S. Pat. No. 2,778,585 "Dynamic Lift Airship" by D. B. Tschudy. D. B. Tschudy's design includes a multi-lobe gasbag with a general aerodynamic shape, formed by catenary cables extending between the upper and lower surfaces of the vehicle.

However, there are problems with such vehicles, especially when they are very large. The generation of dynamic lift from the gasbag of the vehicle creates bending in the gasbag, which are much greater than found in conventional fully buoyant vehicles. Secondly, the lift-generating gasbag is much more aerodynamically unstable and therefore requires much larger tail surfaces than conventional, which in turn creates even greater loads on the gasbag of the vehicle. These two factors would tend to point toward the use of a rigid internal structure. It also allows great leeway in positioning the propulsion systems. However, it has been found designing a ridged internal structure that's light enough and simple enough to produce at a reasonable cost does not appear to be feasible at the present time. Thus a pressure-stabilized gasbag appears to provide the only viable solution. However, providing a gasbag design capable of absorbing flight loads, especially those induced by the vertical and horizontal stabilizers has proven difficult.

Prior art approaches such as disclosed by D. B. Tschudy uses a metal support structure at the rear of the gasbag absorb and distribute loads induced by the horizontal and vertical stabilizers into the gasbag. However, it is a complicated assembly. The three main lobes terminate in the same plane and support structure includes 3 connected cup shaped caps that attach to the ends of the three lobes. While such an approach provides some benefit, it would have insufficient effect in very large vehicle.

However, such placement does not allow for vectoring thrust. Mounting the propulsion system to the non-rigid air bag presents significant structural design problems. Thus most often they are mounted to the gondola in either a fixed position or on pylons so that thrust vectoring can be accomplished. An example can be found in U.S. Pat. No. 5,369,256 "Propulsion System For A Lighter-Than-Air Vehicle" by J. B. Kalisz et al. But this is not the optimum location for non-fully buoyant airships that are achieving a significant amount of aerodynamically produced lift.

Thus, it is a primary object of the invention to provide a propulsion system for non-rigid partially buoyant vehicle.

It is another primary object of the invention to provide a non-rigid partially buoyant vehicle having optimum positioned propulsion systems.

It is further object of the invention to provide a non-rigid partially buoyant vehicle having optimum positioned propulsion systems that are also easy to access for maintenance purposes.

It is a still further object of the invention to provide a non-rigid partially buoyant vehicle having optimum positioned propulsion systems that properly distributes thrust loads into the gasbag.

It is a still further object of the invention to provide a non-rigid partially buoyant vehicle having a propulsion systems that places engines in positions where the use of differential thrust will provide a means of directional control.

SUMMARY OF THE INVENTION

The invention is a propulsion system for a non-ridged and at least semi-buoyant vehicle, the vehicle including a pressure stabilized gasbag having a gondola mounted on the bottom thereof; the vehicle further having front and rear ends, longitudinal, vertical and horizontal axis. The gasbag additionally includes catenary curtains extending from the top of gasbag to the bottom of the gasbag and attached thereto.

In detail, the propulsion system includes a first pair of tubular members attached, preferably pivotally attached, by one of their ends to the gondola. They extend through the gasbag and exit out the top thereof and having propulsion units, preferably turbo-prop engines, attached to their opposite ends. These propulsion units are also preferably rotatably mounted to the tubular members. A second pair of tubular members is attached by one of their ends to the gondola, preferably pivotally attached, and extend into the gasbag and having their opposite ends terminating therewithin. A horizontal tubular member extends through the gasbag and has having its ends extending out of the sides thereof and is attached to the opposite ends of the second pair of tubular members in the middle thereof. The ends of the horizontal tubular member also have propulsion units attached thereto.

Attachment assemblies are mounted to the surface of the gasbag for securing the first and second pairs of tubular members and the horizontal tubular member thereto and to transfer the thrust loads generated by the propulsion units into the gasbag. The attachment assemblies are mounted in holes in the external surface of the gasbag through which the first pair of tubular members and the horizontal tubular member extend. The attachment assemblies include a hollow tube through which the tubular members slidaby extend. Attachment fittings secure the hollow tube to the external surface of the gasbag. The hollow tube further includes seals mounted therein for sealing the tubular member to the hollow tube. This allows the surface of the gasbag to move in relationship to each of the tubular members yet absorb the thrust loads produced by the propulsion units.

The first pairs of tubular members are aligned with the catenary curtains and attachment devices are used to couple the first pair of tubular members to the catenary curtains, such that vertical shear loads induced into the catenary curtains by the gondola when the vehicle takes off are at least partially distributed into the first and second pairs of tubular members. The horizontal tubular member passes through holes in the catenary curtains. Second attachment devices couple the horizontal tubular member to the catenary curtains; again such that vertical shear loads induced into the catenary curtains by the gondola when the vehicle takes off are at least partially distributed into the first and second pairs of tubular members.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Referring to FIGS. 1–5, the vehicle, generally indicated by numeral 10, includes a pressure stabilized gasbag 12 having a front end 14 and rear end 16, longitudinal axis 20, vertical axis 22, and horizontal axis 24. Thus gases such a Helium or Hydrogen, preferably the former, are used for pressurization. The gasbag 12 further has an aerodynamic shape capable of producing lift. A suitable bag material is disclosed in U.S. patent application Ser. No. 08/799,635 "Flexible Material for Use In An Inflatable Structure" filed Feb. 12, 1997 to Sidwell (common assignee). Attached to the lower surface 28 is a gondola 30, in a manner to be subsequently discussed. The gondola 30 includes a flight station 32, cargo compartments 34 and nose and main landing gears, indicated by numerals 36 and 38, respectively. The vehicle 10 also includes a propulsion system 42 containing four propulsion units 44A, 44B, 44C and 44D, and as illustrated the propellers are driven by turbo-shaft engines. Attached to the rear end 16 is a horizontal and vertical tail assembly 46, also in a manner to be subsequently discussed. The center of gravity, indicated by numeral 47, is slightly in front of the main landing gear 38. Therefor, it can be seen that the vehicle 10 is a non-rigid, semi-buoyant type vehicle and, therefore, takes off and lands like an aircraft, however at a very low speed.

Figure 1:
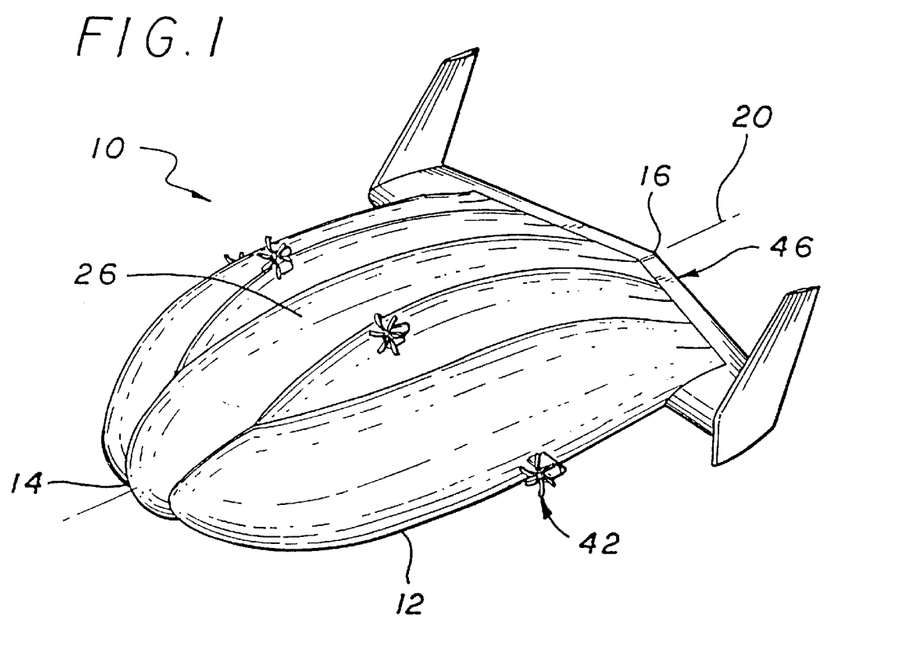
FIG. 1 is a perspective view of the aircraft.
Figure 2:
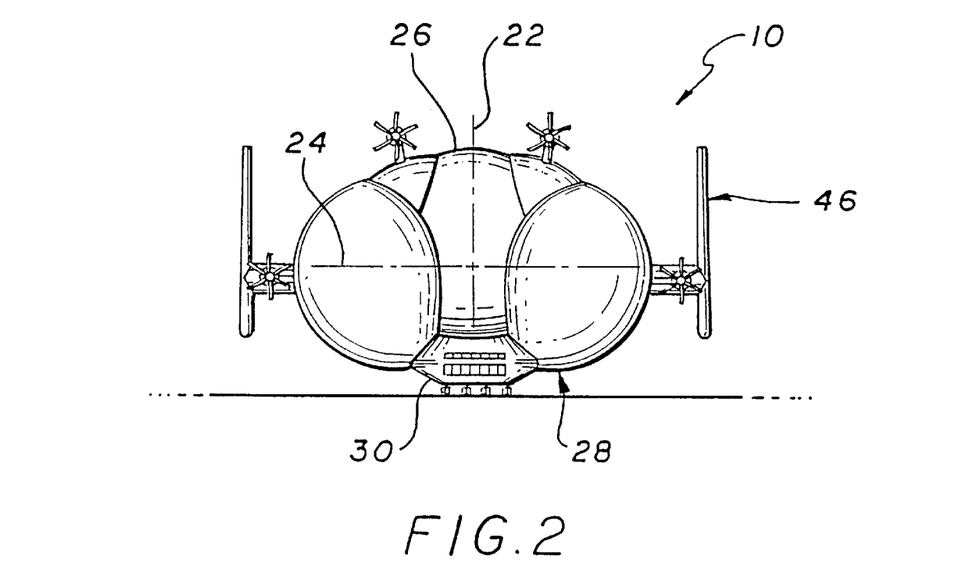
FIG. 2 is a front view of the aircraft.
Figure 3:
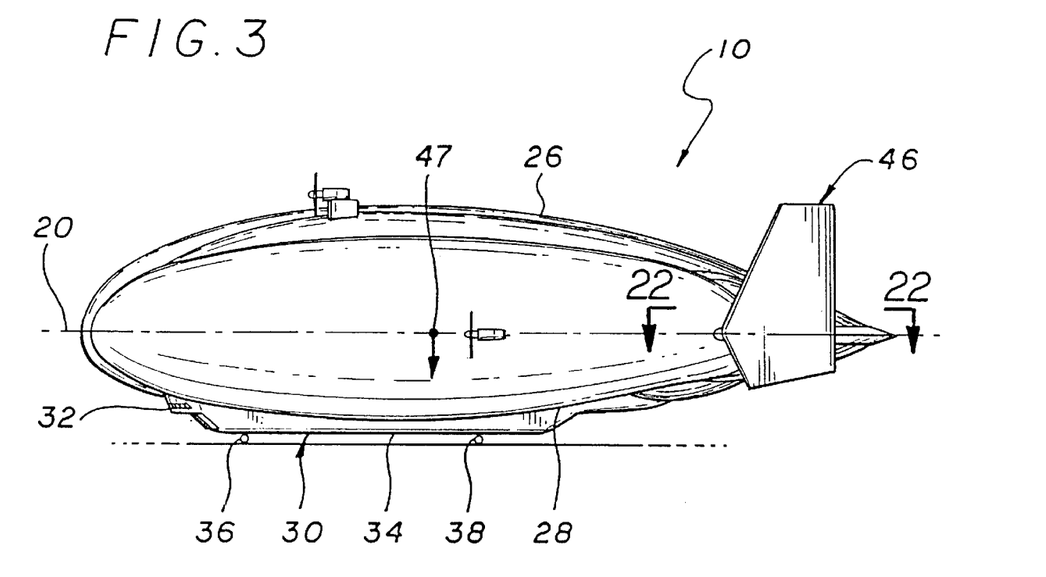
FIG. 3 is a side view of the aircraft.
Figure 4:
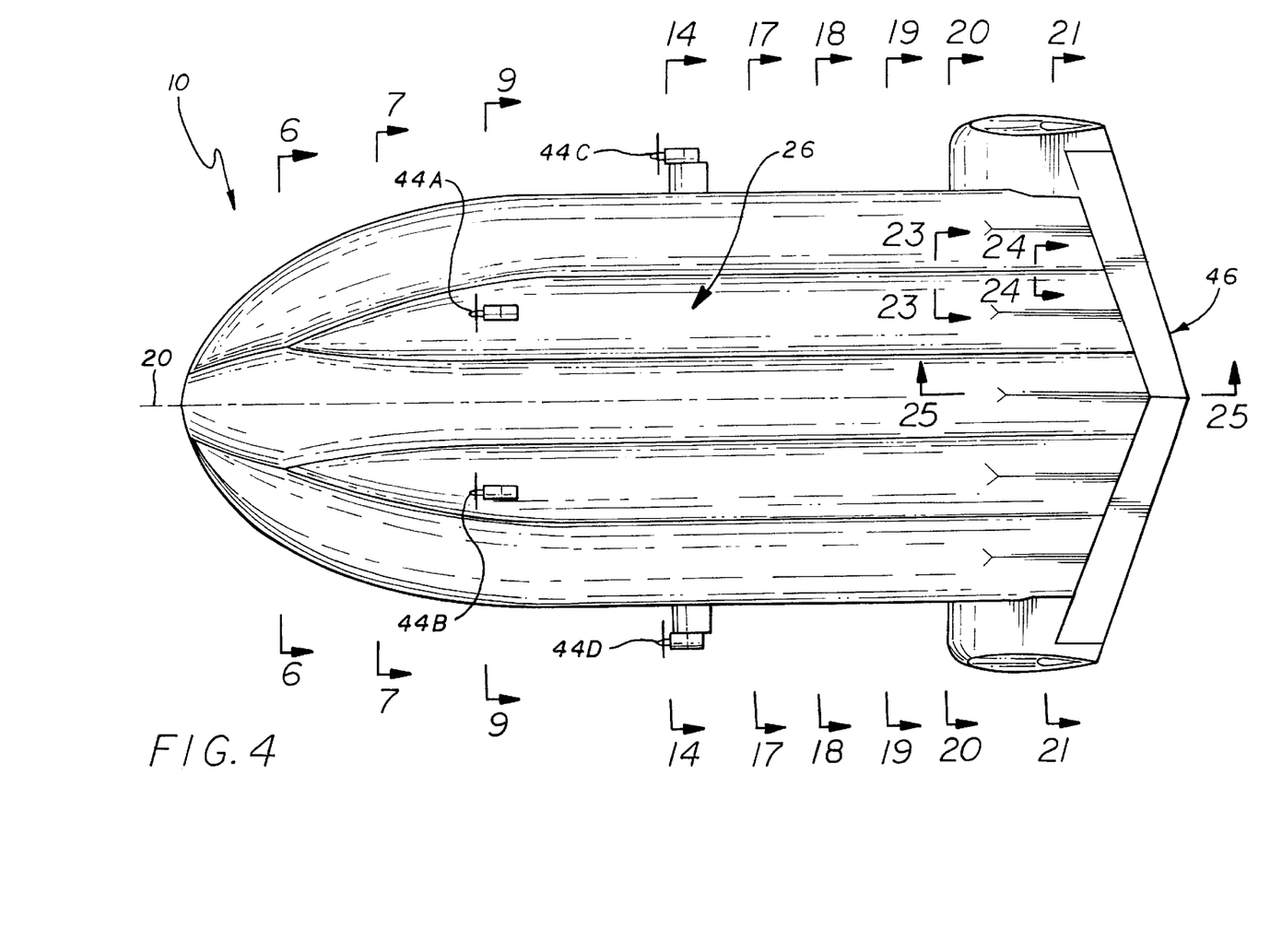
FIG. 4 is a top view of the aircraft.
Figure 5:
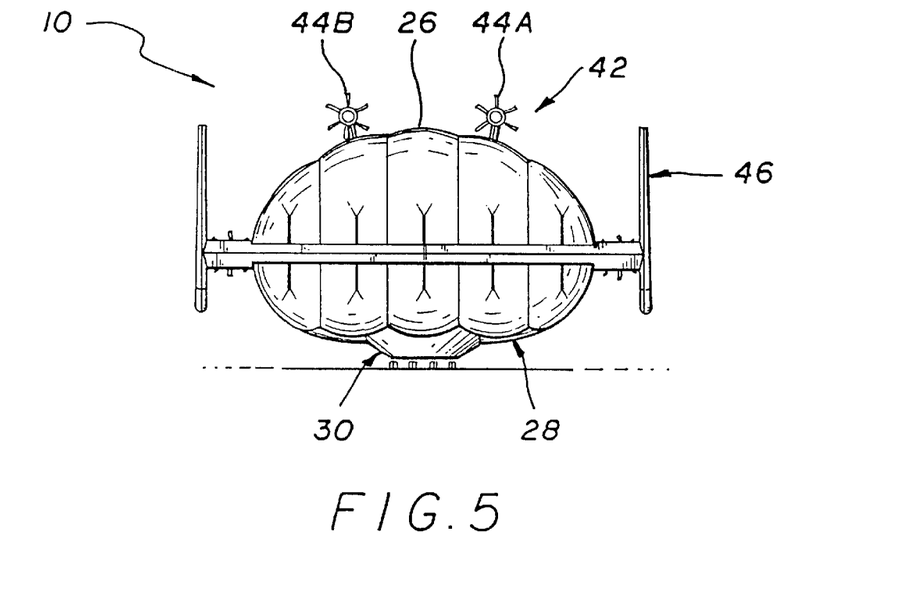
FIG. 5 is a rear view of the aircraft.
Figure 6:
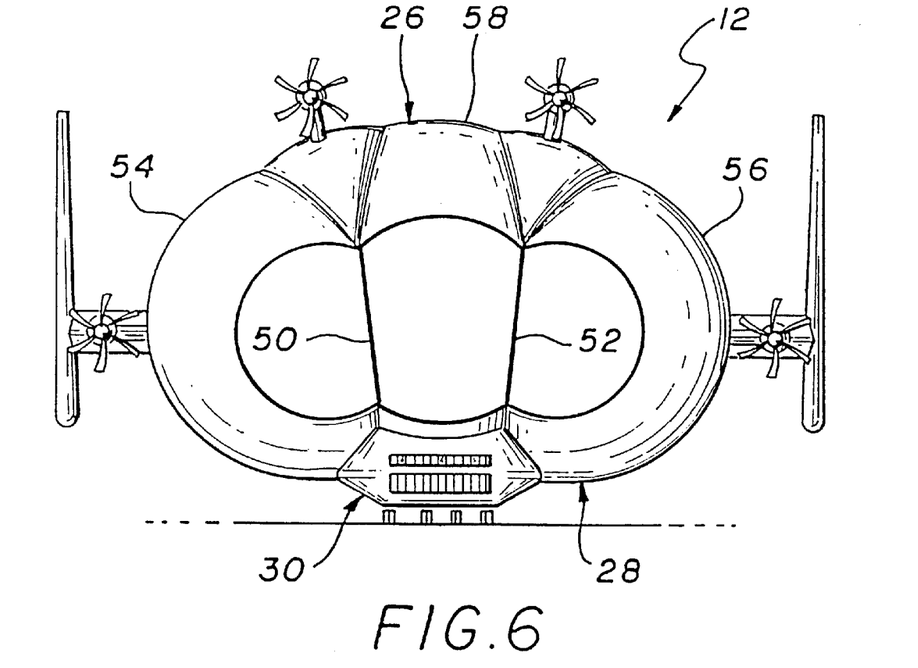
FIG. 6 is a cross-sectional view of FIG. 4 taken along the line 6—6.
Figure 7:
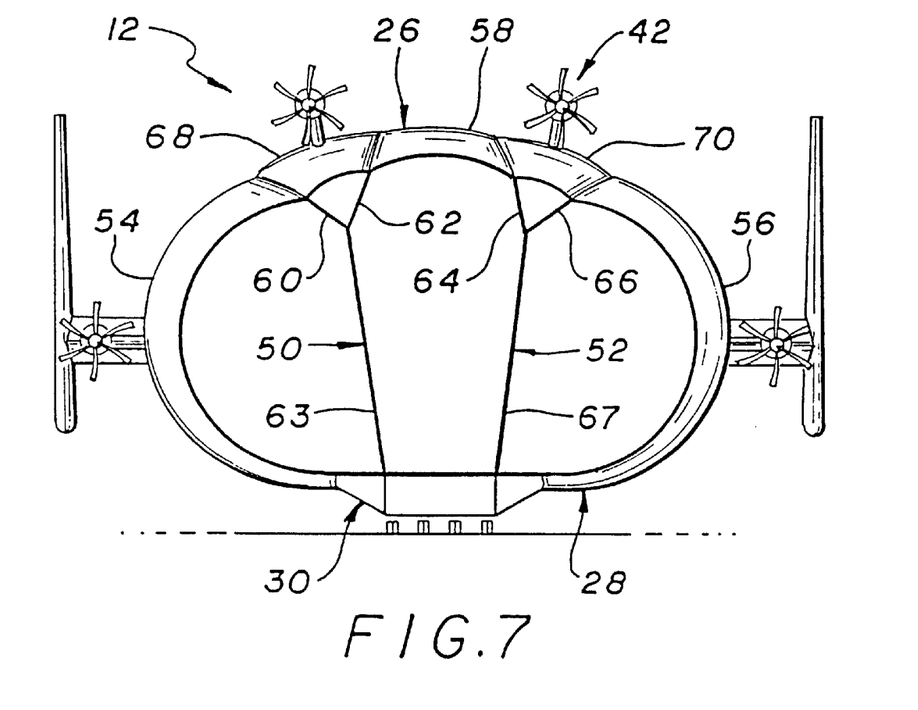
FIG. 7 is a cross-sectional view of FIG. 4 taken along the line 7—7.
Figure 8:
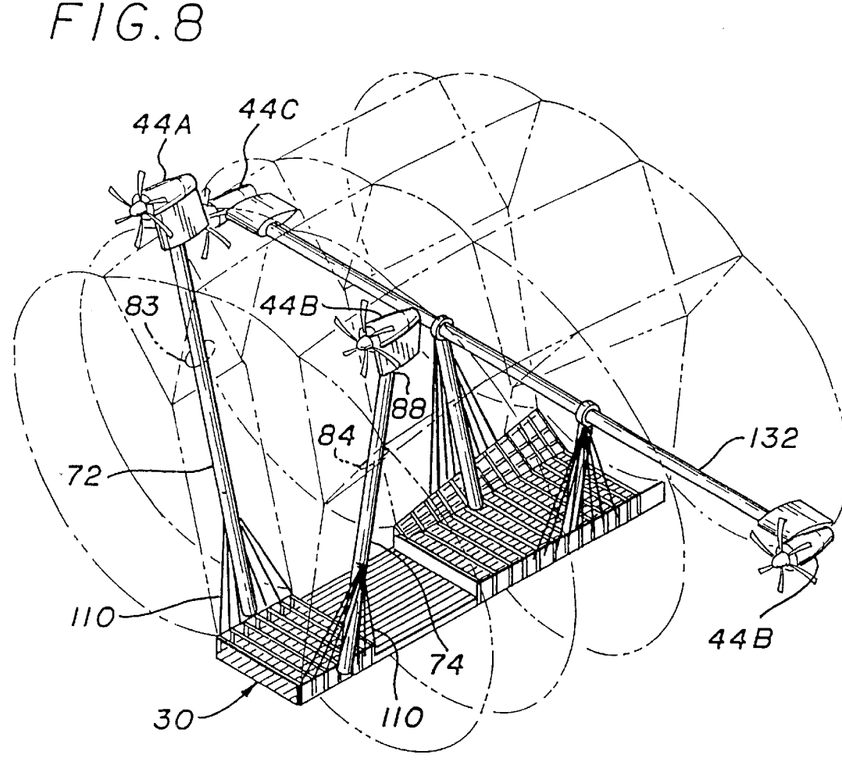
FIG. 8 is a partial perspective interior view of FIG. 1 illustrating the front portion of the propulsion system.
Figure 9:
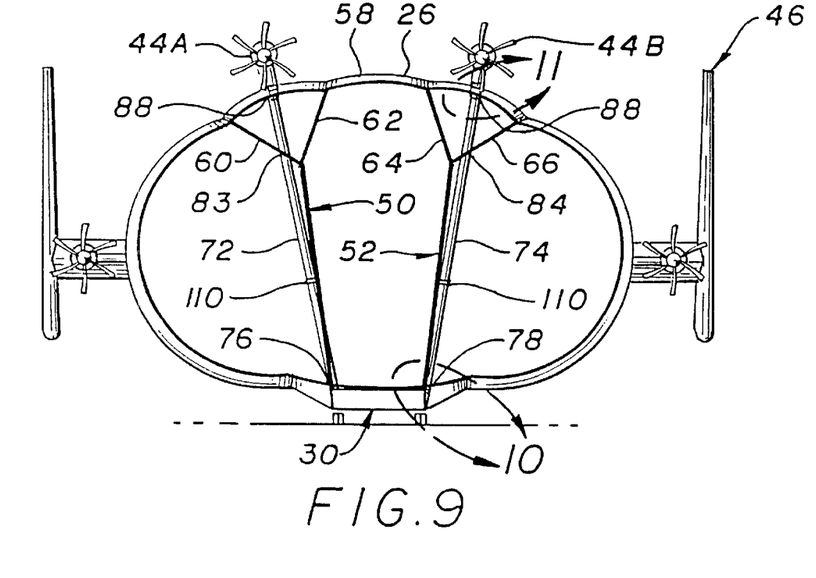
FIG. 9 is a cross-sectional view of FIG. 4 taken along the line 9—9.
Figure 10:
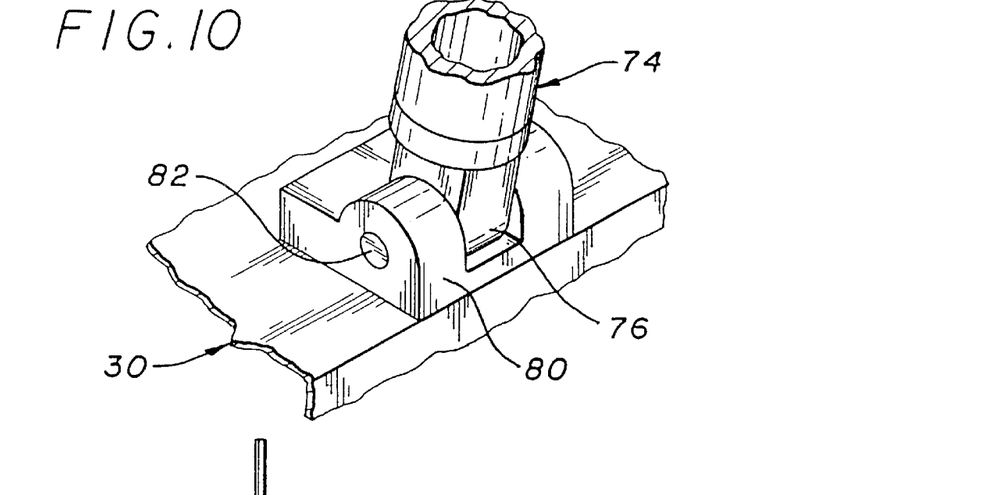
FIG. 10 is an enlarged portion of FIG. 1 illustrated the mounting of the tubular members of the front portion of the propulsion system to the gondola of the vehicle.

Still referring to FIG. 1 and additionally to FIG. 6, the gasbag 12 near the front 14 includes a pair of primary catenary curtains 50 and 52 (some times referred to "septums") which are attached to top and bottom surfaces 26 and 28. At the bottom surface 28 when over the gondola 30 they attach thereto and provide its primary support. The catenary curtains 50 and 52 thus form side lobes 54 and 56 and a center lobe 58. As seen in FIG. 7, the catenary curtain 50 changes into a Y shape with the arms 60 and 62 and leg 63 and curtain 52 changes into a Y shape with arms 64 and 66, and leg 67, forming additional lobes 68 and 70 in the top surface 26 of the gasbag 12. This transition begins at a point approximately between 20 to 22 percent of the length of the gasbag 12 measured from the front end 14.

Figure 11:
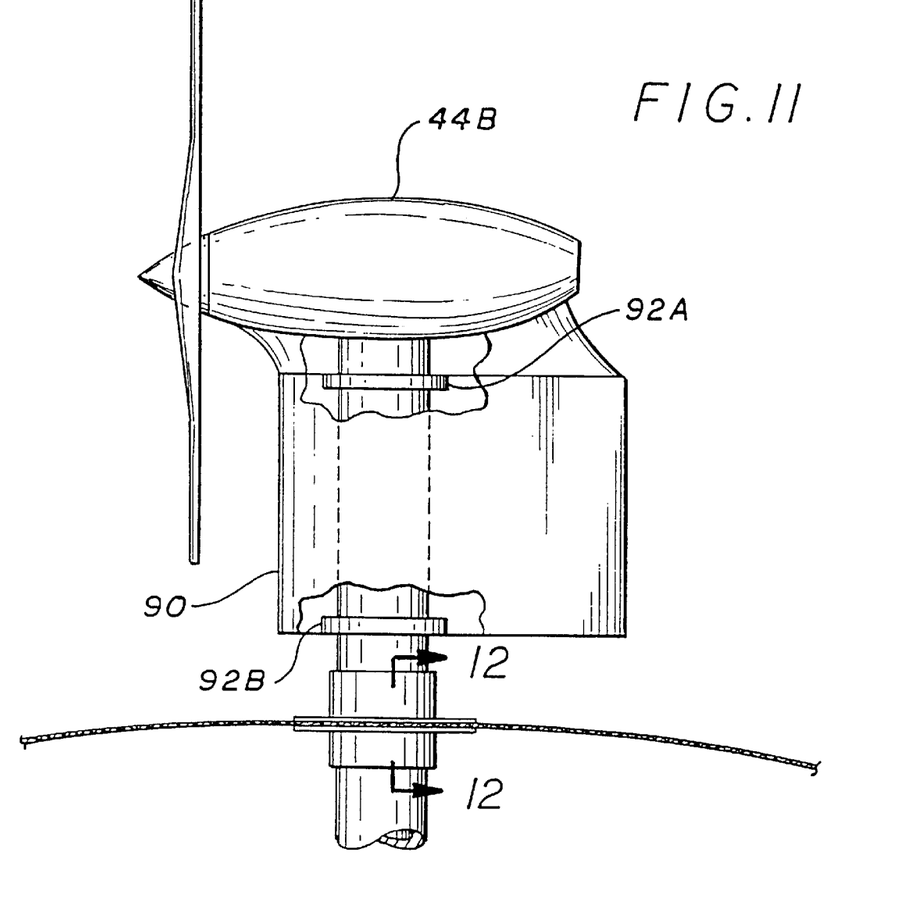
FIG. 11 is an enlarged view of a portion of the propulsion system shown in FIG. 8 illustrating the mounting of the propulsion units to the tubular members.
Figure 12:
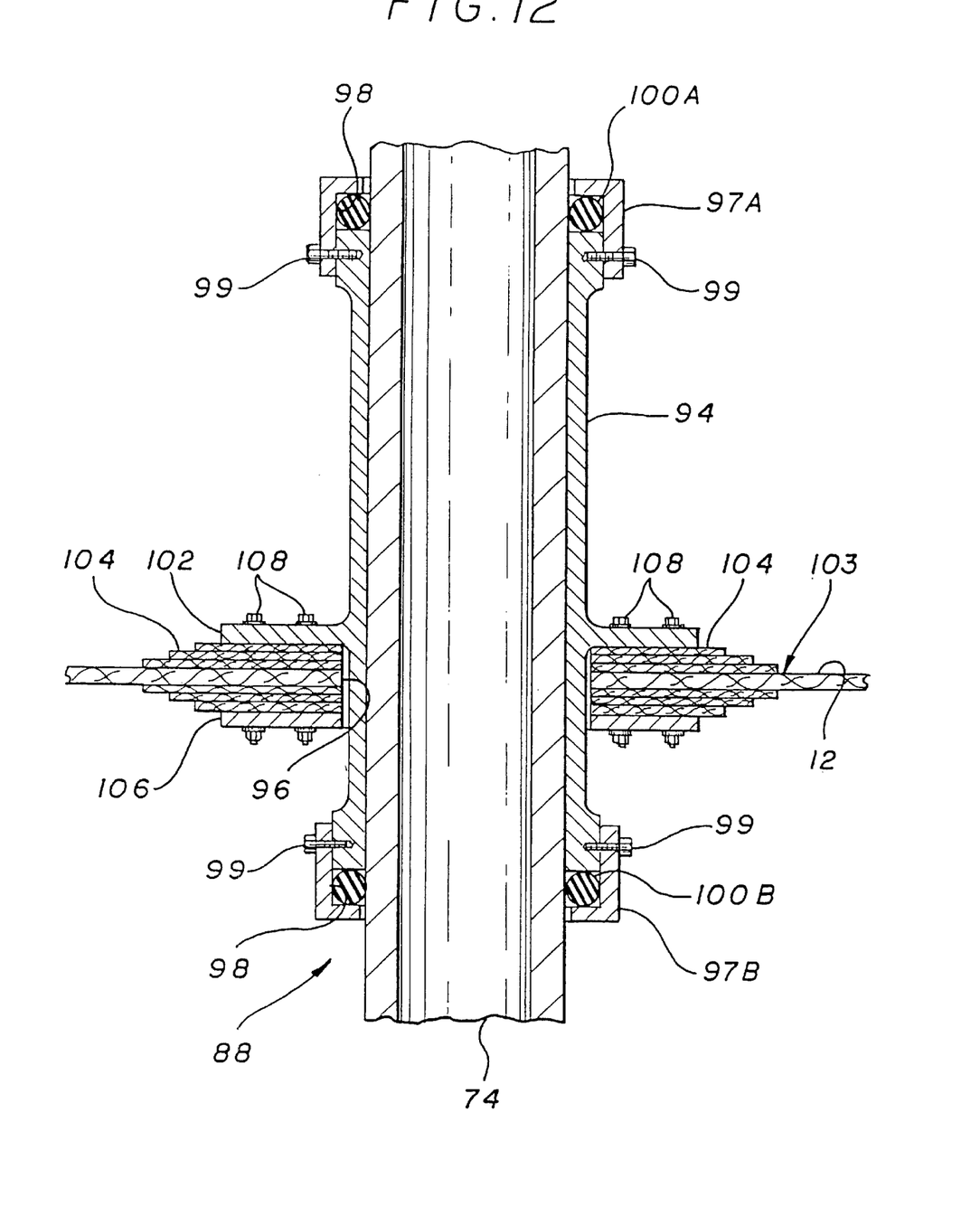
FIG. 12 is a cross-sectional view of FIG. 11 taken along the line 12—12 illustrating the propulsion system tubular member to gasbag seal.

Still referring to FIG. 1 and additionally to FIGS. 8–12, the propulsion system includes a pair of vertical tubular members 72 and 74 having first ends terminating in lugs 76 and 78 pivotally attached to clevis 80 mounted on the gondola 30 by means of pins 82 at point in front of the center of gravity 47. The tubular members extend through holes 83 in the arms 60 and 66 of the catenary curtains 50 and 52 with the second ends 84 and 86 extending out of the upper surface 26 of the gasbag 12 through bearing assemblies 88 mounted to the upper surface. Referring particularly to FIGS. 11 and 12, the propulsion assemblies 44A and 44B include a pylon aerodynamic fairing assembly 90 that incorporate pivot bearings 92A and 92B. Rotation is accomplished by a motor assembly (not shown) mounted within fairing 90. Each bearing assembly 88 includes a hollow tubular member 94 that extends through a hole 96 in the gasbag 12 and in which the tubular members 72 and 74 are slidably mounted. End caps 97A and 97B secured thereto by fasteners 98 form recesses 99 for O-rings seals 100A and 100B. The tubular member 94 includes an external flange 102, which is in contact with the external surface of the gasbag 12 about the hole 96. The immediate area 103 of the gasbag 12 about the hole 96 is reinforced with a plurality of reinforcing plies 104. A flat ring 106 mounted about the tubular member 94 sandwiches the reinforced area 103 between it and the flange 102 and the two are secured together by means of fasteners 108. Thus the thrust of the propulsion units 44A and 44B is transmitted via the tubular members 72 and 74 into the gasbag 12 via the fittings 88.

Figure 13:
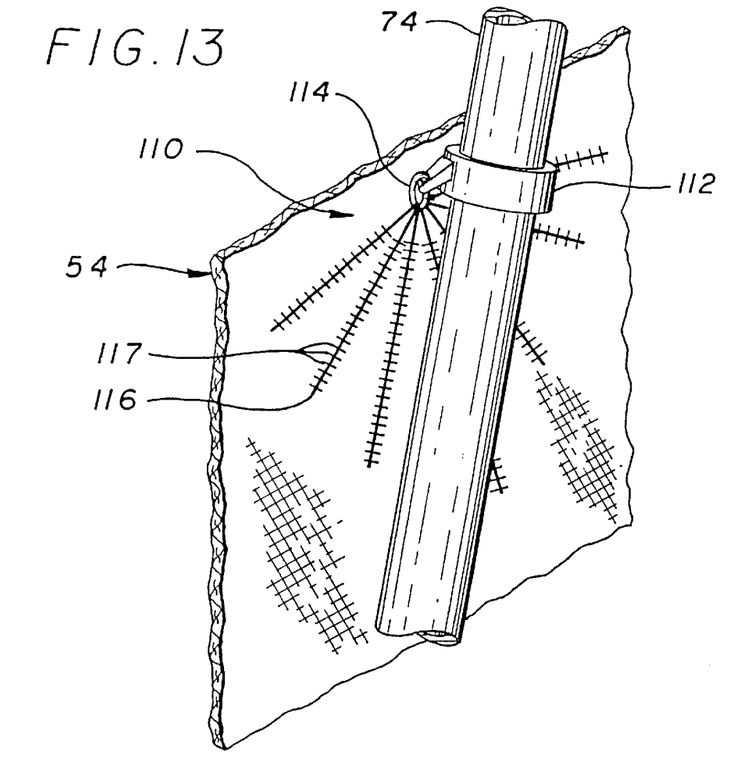
FIG. 13 is an enlarged perspective view of the attachment fitting connecting the forward propulsion system mounting tube to the catenary curtain.

Referring to FIG. 13, the tubular member 74 is also attached to the catenary curtain 52 by means of an attachment fitting 110. The attachment fitting 110 includes a ridged ring member 112 mounted to the tubular fitting 74. A secondary ring 114 is pivotally attached to rigid ring 112. A plurality of flexible strands 116 are attached at one end to the secondary ring 114 with the cables fanning out along the curtain 52 and attached along their length to the curtains providing additional support for the tubular member 74. The tubular member 72 is attached to catenary curtain 50 in a similar manner. The strands 116 transfer vertical shear loads into the tubular members that are induced into the curtains by the gondola at takeoff.

Figure 14:
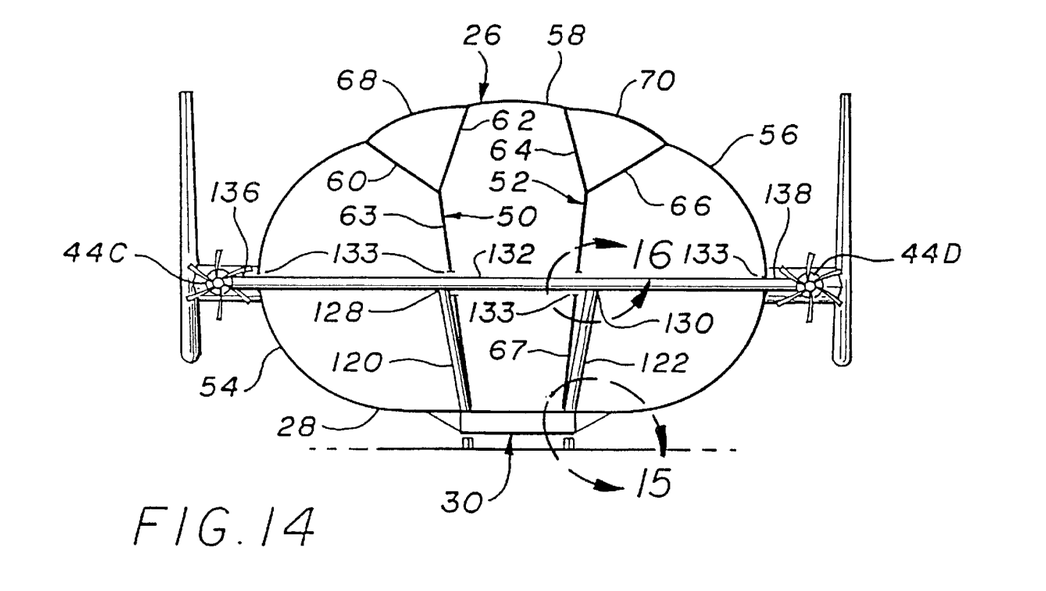
FIG. 14 is a cross-sectional view of FIG. 4 taken along the line 14—14.
Figure 15:
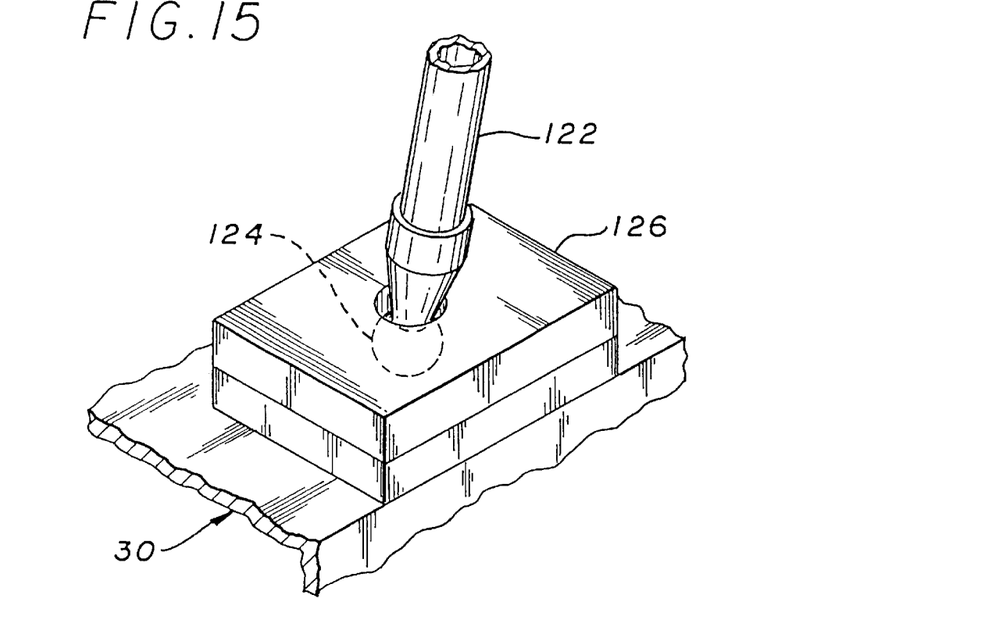
FIG. 15 is an enlarged perspective view of the attachment fitting connecting the rear propulsion system mounting tube to the gondola.
Figure 16:
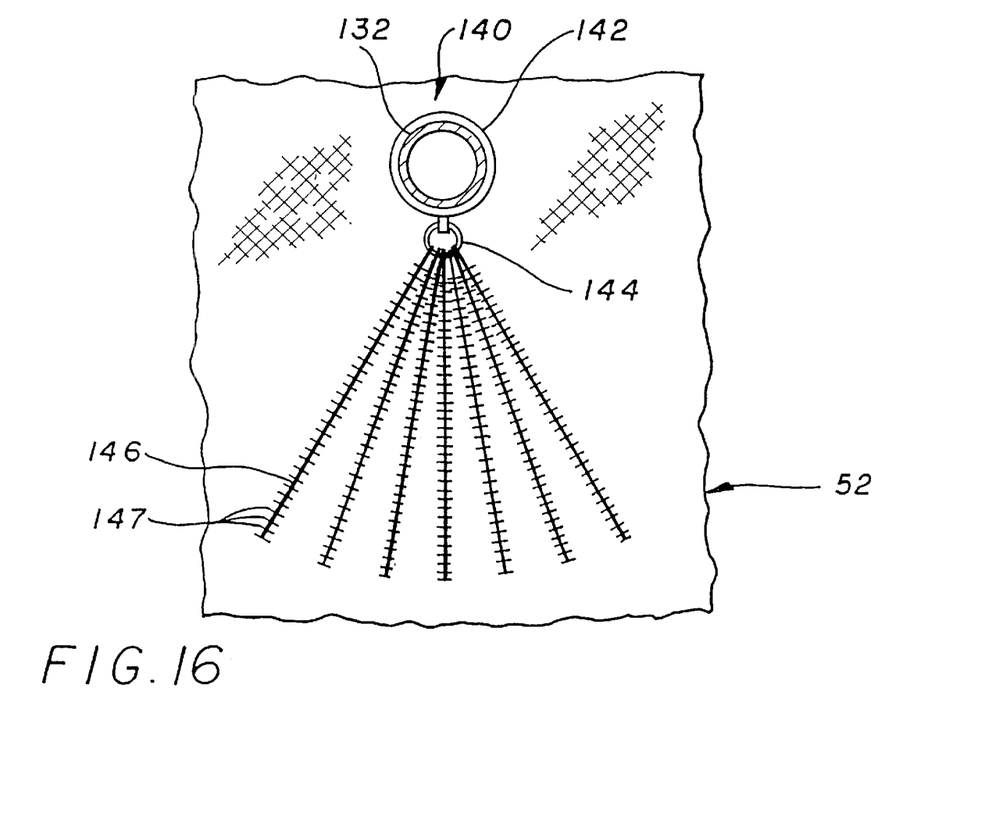
FIG. 16 an enlarged perspective view of the attachment fitting connecting the rear propulsion system mounting tube to the catenary curtain.

Referring to FIGS. 14–16, the propulsion system further includes vertically extending tubular members 120 and 122 having first ends terminating in an attachment ball 124 that is pivotally secured in a socket 126 mounted on the side of the gondola 30 above the main landing gear 38 forming a ball joint (only the tubular member 122 is shown in detail). The opposite ends 128 and 130 are rigidly attached to a horizontal tubular member 132 that extends through holes 133 in the catenary curtains 50 and 52 and out the sides of the gasbag 12. Ends ends 136 and 138 of the tubular member 132 are coupled to propulsion units 44C and 44D. The Propulsion units 44C and 44D are connected to the ends 136 and 138 of the tubular member 132 in manner similar to the connection of propulsion units 44A and 44B to tubular members 72 and 74. In addition, the tubular member 132 is sealed to gasbag 12 in a manner similar to tubular members 72 and 74 (by means of fittings 88).

Referring to FIG. 16, the tubular member 132 is also attached to the legs 63 and 67 of the catenary curtains 52 and 54 by means of attachment fittings 140. Each attachment fitting 140 includes a ridged ring member 142 mounted to the tubular fitting 132. A secondary ring 144 is pivotally attached to rigid ring 142. A plurality of flexible strands 146 are attached at one end to the secondary ring 114 with the strands fanning out along the curtains 52 and 54 and are attached along there length to the curtains by means of stitches 147. Again as in the case of attachment fittings 110, attachment fittings 140 transfer vertical shear loads induced into the curtains by the gondola at takeoff into the tubular members 120 and 122.

Thus the propulsion system with four rotatable propulsion units in pairs of two, 44A and 44B extending out the top surface 26 of the vehicle 10 and 44C and 44D extending out the side of the vehicle, in a staggered relationship both vertically and horizontally, and being rotatable, provide excellent directional control, particularly when landing.

Figure 17:
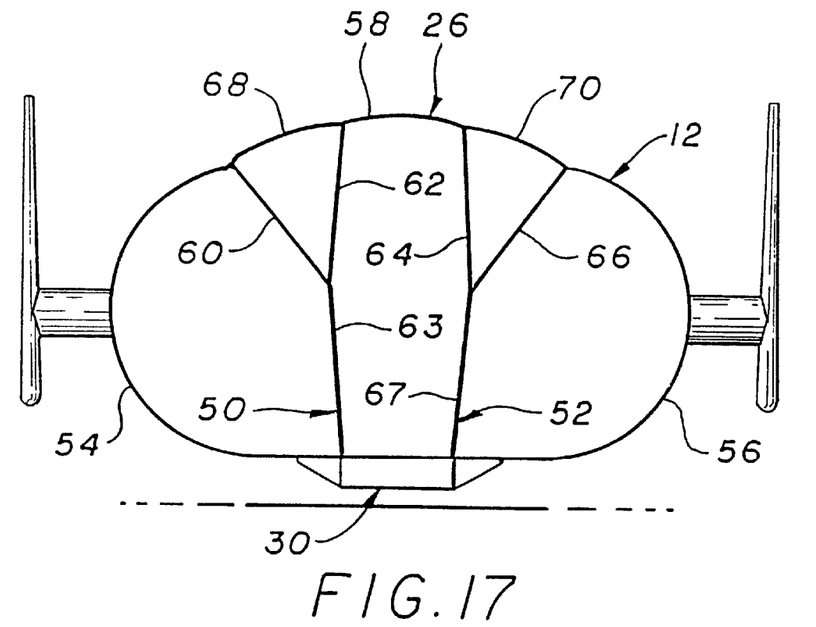
FIG. 17 is cross-sectional view of FIG. 4 taken along the line 17—17.
Figure 18:
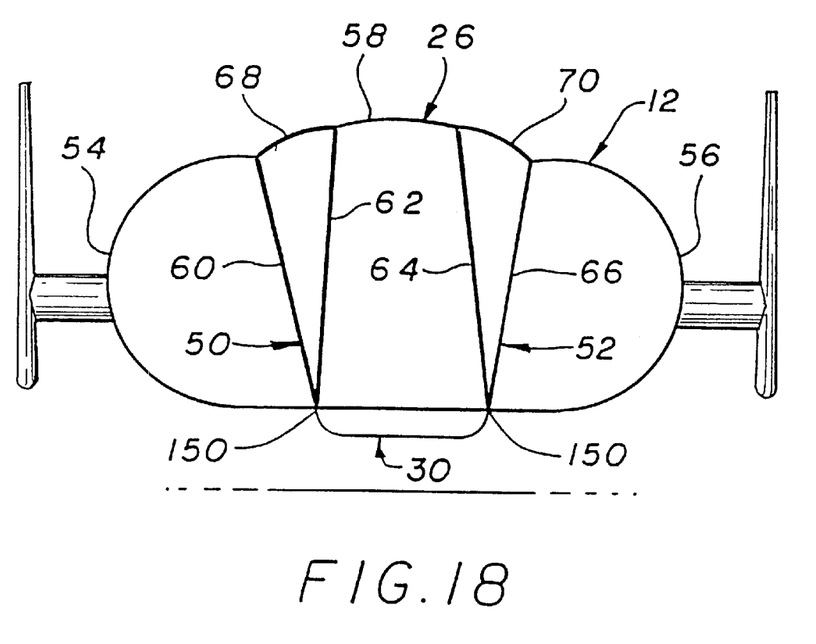
FIG. 18 is cross-sectional view of FIG. 4 taken along the line 18—18.
Figure 19:
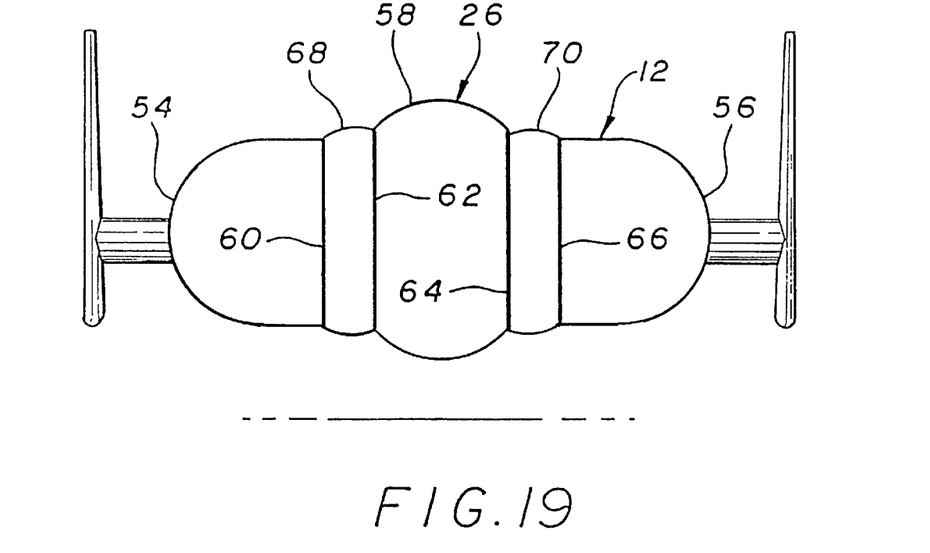
FIG. 19 is cross-sectional view of the vehicle shown in FIG. 4 taken along the line 19—19.
Figure 20:
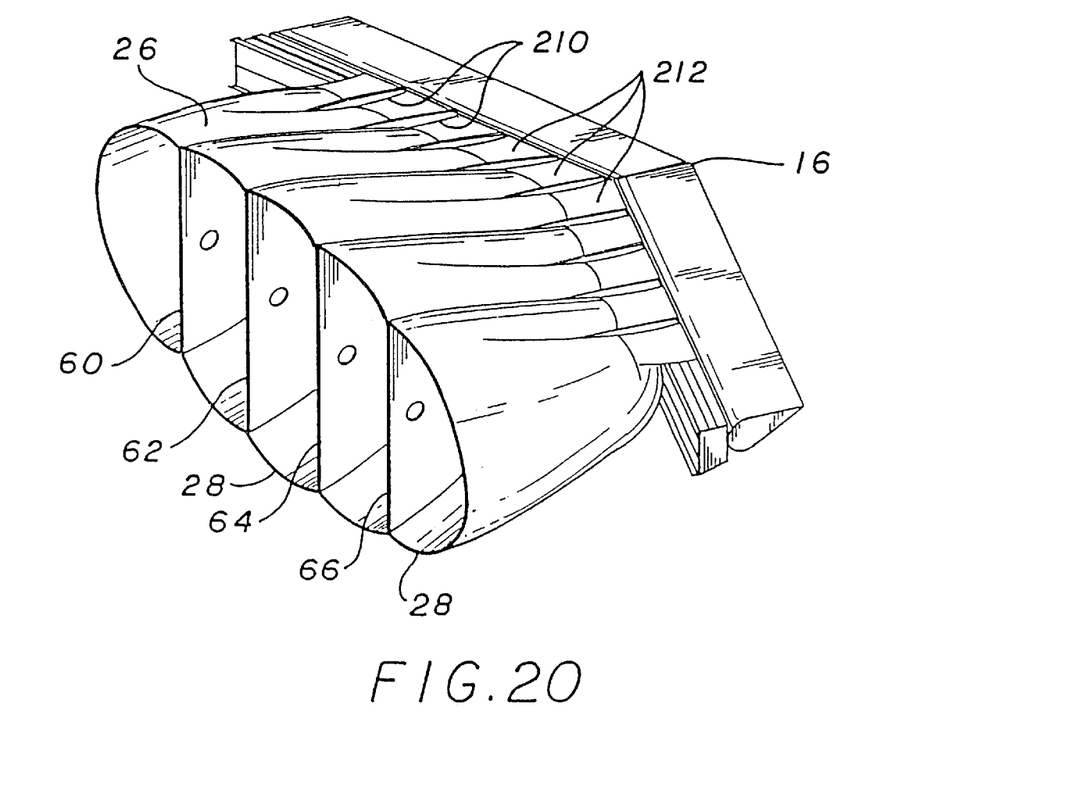
FIG. 20 is a partial perspective view of the vehicle shown in FIG. 4 taken along the line 20—20 in FIG. 4.

Referring now to FIGS. 17–19 as the catenary curtains 50 and 52 continue aft and, beginning at around 50 to 52 percent of length of the gasbag 12 measured from the front end 14, the Y becomes deeper, such that is the arms 60 and 62 of curtain 50 and arms 64 and 66 of the curtain 52 become longer (FIG. 17). Further on toward the rear end 16 as shown in FIG. 18, the arms form a V with the apex 150 at the bottom surface 28 and the legs 63 and 67 disappear. Thereafter, as shown in FIG. 19, the arms 60, 62, 64 and 66 now start to spread apart at the bottom until they become vertical as indicated in FIG. 20. This occurs at about approximately 52 to 54 percent of the distance along the length of the gasbag 12 as measured from the front end 14.

Figure 21:
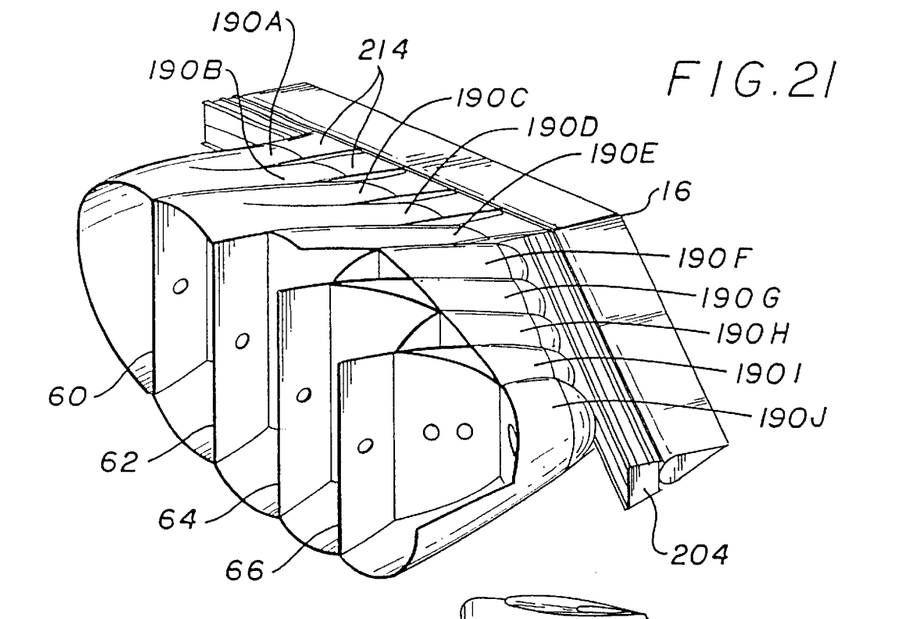
FIG. 21 is a partial perspective view of the aft portion of the vehicle shown in FIG. 4 taken along the line 21—21.
Figure 22:
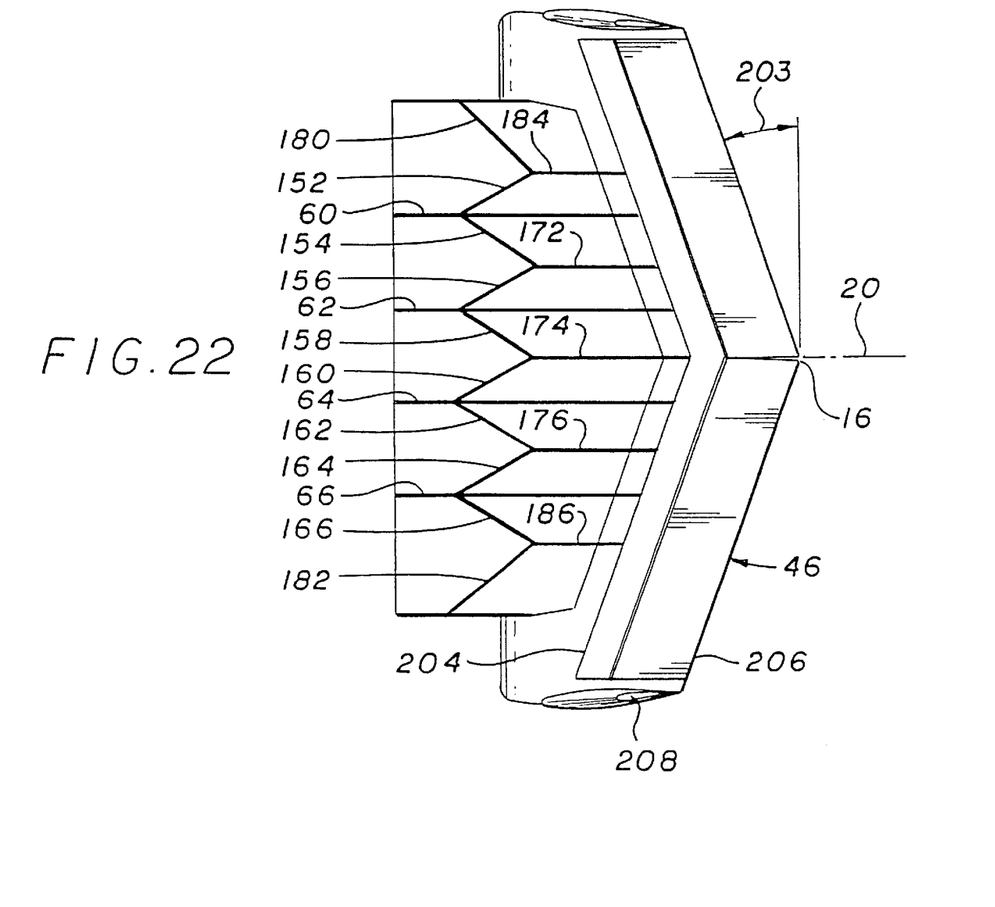
FIG. 22 is a cross-sectional view of the aft portion of the vehicle shown in FIG. 3 taken along the line 22—22.
Figure 23:
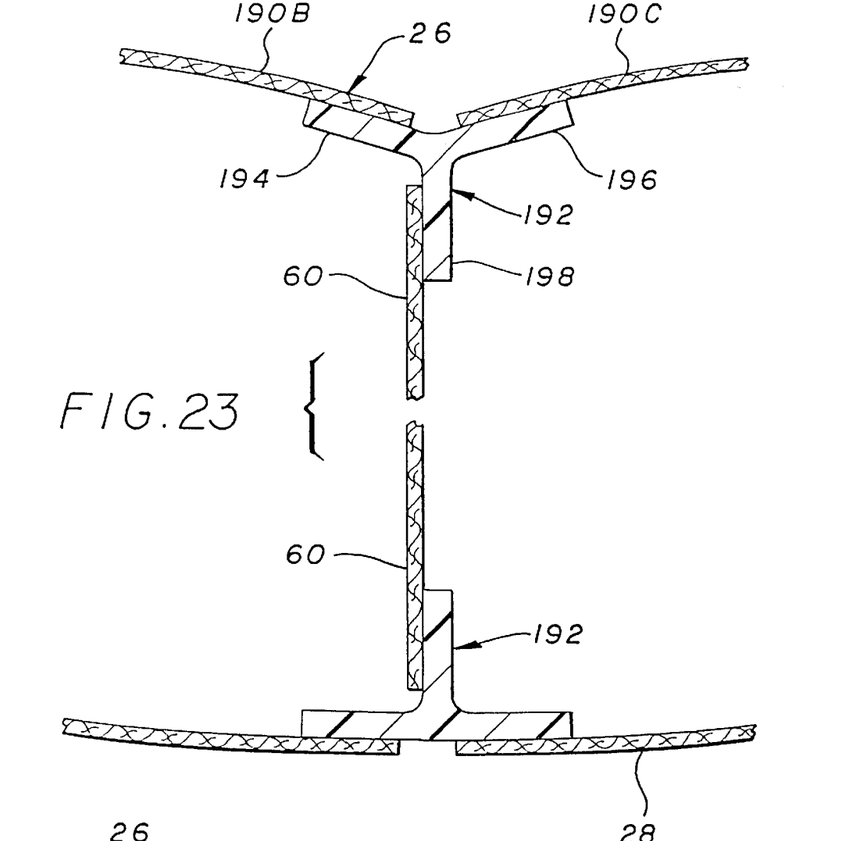
FIG. 23 is a cross-sectional view of the vehicle shown in FIG. 4 taken along the line 23—23.

Further along toward the rear as illustrated in FIGS. 21 and 22, additional secondary vertical curtains 152 and 154, 156 and 158, 160 and 162, 164 and 166 extend out ward toward the tail 16 from either side of the now vertical curtains 60, 62, 64 and 66, respectively, at an acute angle thereto. Curtains 154 and 156, 158 and 160, and 162 and 164 meet and join and form single curtains 170, 172 and 174 between curtains 60, 62 64 and 66 that extend to the rear end of the gasbag 12. Curtains 152 and 166 meet and join with outer most curtains 180 and 182 extending inward from the side of the gasbag 12 to from vertical curtains 184 and 186 that extend to the rear of the gasbag. This transition begins at about approximately 65 to 70 percent of the length of the gasbag 12 measured from the front end 14 (30 to 33 percent measured from the rear of the gasbag). Thus the tail end of the gasbag terminates in 9 vertical curtains creating 10 smaller lobes 190A, 190B, 190C, 190D, 190E, 190F, 190G, 190H, 190I and 190J. Referring to FIG. 23, the typical lobe to curtain joint is accomplished by means of Y shaped transition members 192. As illustrated, lobes 190B and 190C are joined to the arms 194 and 196 of the Y member 192 and the leg 198 to the vertical curtain 60.

Figure 24:
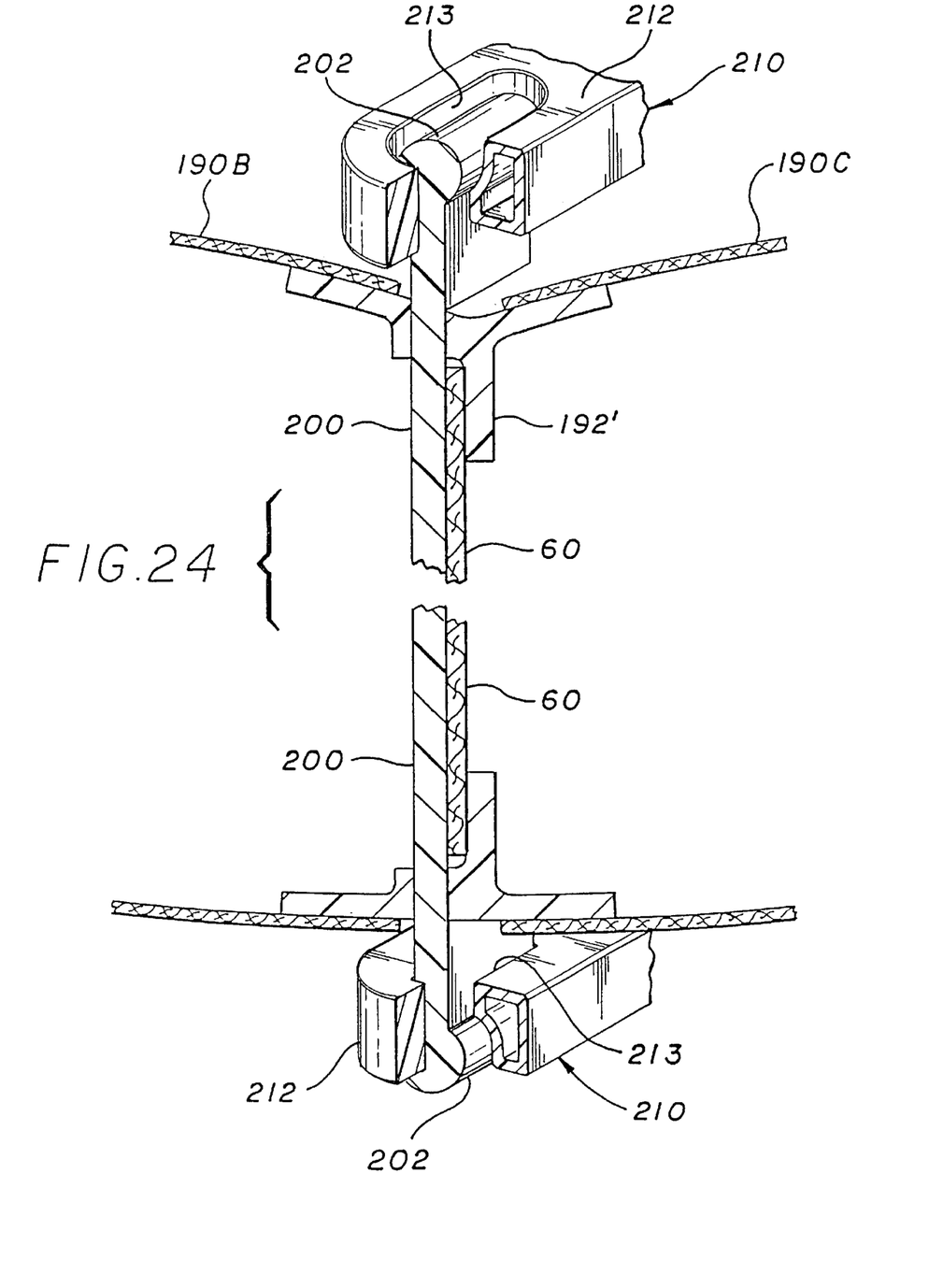
FIG. 24 is a cross-sectional view of a portion of the rear of the vehicle shown in FIG. 4 taken along the line 24—24.
Figure 25:
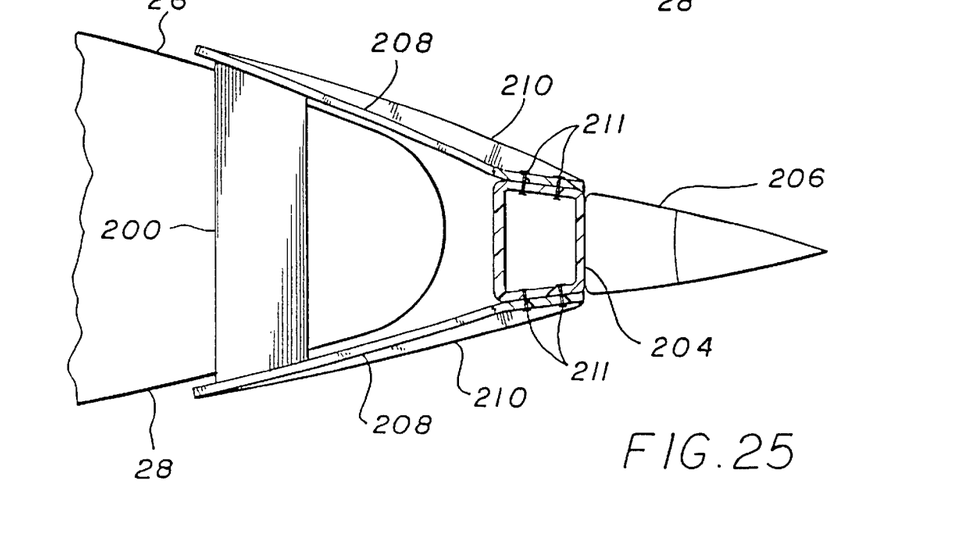
FIG. 25 is a cross-sectional view of a portion of the rear of the vehicle shown in FIG. 4 taken along the line 25—25.

Still referring to FIG. 23 and additionally to FIGS. 24 and 25, in proximity to the rear end of the gasbag 12, a flat flexible strap 200, preferably made of a high modulus composite material, extends along a short portion of each of the vertical curtains 172–186 and is bonded thereto. The strap 200 extends out of the gasbag through the Y shaped members 192' modified to accept the strap. The strap 200 terminates at each end in an elongated bulb like fittings 202.

The tail assembly 46 is forward swept at a shallow angle 203 of around 20 degrees and includes an equally swept support beam 204 with the horizontal and vertical stabilizers 206 and 208 mounted thereto. Attachment fittings 210 are attached at one end to the top and bottom of beam 204 and extend forward on both the top and bottom surfaces 26 and 28 of the gasbag 12 and over the curtains 60–66, and 172–186 and terminate in slotted member 212 having a slot 213 that engage the bulb like fittings 202 of the strap 200. Cloth aerodynamic fairings 214 are attached at one end to the gasbag 12 and at the opposite ends to the beam 204 providing aerodynamic covers reducing drag. The length of the strap 200 and the placement of the attachment fittings are such that the strap is placed in tension. Thus loads form the tail member 46 are distributed into the gag bag 12 along the entire rear end thereof. By use of a large number of vertical curtains at the rear, loads are transferred forward in a uniform fashion. In addition, the forward sweep at the rear end 16 provides for lifting gas to be positioned slightly within the tail assembly envelop providing a lift force in proximity thereto. This has the affect of shifting the center of buoyancy aft and closer to the center of gravity 47. Ideally one would want the center of buoyancy aligned with the center of gravity.

While the invention has been described with reference to a particular embodiment, it should be understood that the embodiment is merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to the aircraft industry.

What is claimed is:

1. A non-rigid and at least semi-buoyant vehicle, of the type having a pressure stabilized gasbag, a gondola mounted on the bottom thereof; the vehicle further having front and rear ends, longitudinal, vertical and horizontal axis, and a propulsion system comprising:

a first pair of tubular members having first and second ends, said first pair of tubular members attached by said first ends to the gondola, said first pair of tubular members extending through the air bag and exiting out the top thereof and having propulsion units attached to said second ends;

a second pair of tubular members having first and second ends, said second pair of tubular members attached by said first ends to the gondola, said second pair of tubular members extending into the gasbag and having said second ends terminating therewithin; and a horizontal tubular member extending through the gasbag having its ends extending out of the sides thereof the gasbag and coupled to said second ends of said second pair of tubular members in the middle thereof, and further having propulsion units attached to said ends thereof.

2. A vehicle as set forth in claim 1 wherein said means mounted within the gasbag for securing said first and second pairs of tubular members and said horizontal tubular member to said gasbag comprises:

the gasbag having holes in the external surface through which said first and second tubular members and said horizontal tubular member extend therethrough;

an attachment fitting mounted in each of said holes, said attachment fitting comprising:

a hollow tube through which said each tubular member slidably extends;

second attachment fittings for securing said hollow tube to the external surface of the gasbag; and seal means mounted in said hollow tube for sealing said tubular member to said hollow tube;

such that the surface of the gasbag can move in relationship to said tubular member of said first and second pairs of tubular members.

3. A vehicle as set forth in claim 2 wherein said propulsion units are rotatably mounted to said second ends of said first pair of tubular members and said ends of said horizontal tubular members.

4. A vehicle as set fourth in claim 3 wherein said tubular members of said first and second pairs of tubular members are located on opposite sides of the longitudinal axis of the vehicle.

5. The vehicle as set forth in claim 4 wherein the gasbag includes catenary curtains extending from the top of gasbag to the bottom of the gasbag and attached thereto, said propulsion system further comprising:

said first pairs of tubular members aligned with the catenary curtains;

attachment means for coupling said first pair of tubular members to the catenary curtains;

such that vertical shear loads induced into the catenary curtains by the gondola when the vehicle takes off are at least partially distributed into the first and second pairs of tubular members.

6. A vehicle as set forth in claim 5 wherein the catenary curtains includes holes therethrough, said propulsion system further comprising:

said horizontal tubular member passing through said holes in the catenary curtains; and attachment means for coupling said horizontal tubular member to the catenary curtains;

such that vertical shear loads induced into said catenary curtains by the gondola when the vehicle takes off are at least partially distributed into said first and second pairs of tubular members.

7. A vehicle as set forth in claim 6 wherein said propulsion units are turbo-prop engines.

8. A vehicle as set forth in claim 1 or 2, or 3, or 4, or 5, or 6, or 7, wherein said first ends of said first pair of tubular members are pivotally attached to the gondola with a pivot axis parallel with the longitudinal axis of the vehicle.

9. A vehicle as set forth in claim 1 wherein said first ends of said second pair of tubular members are pivotally attached to the gondola by means of a ball joint.

10. A non-rigid and at least semi-buoyant vehicle, the vehicle further having front and rear ends, longitudinal, vertical and horizontal axis, the vehicle comprising:

a pressure stabilized gasbag;

a gondola mounted on the bottom of said gasbag; and a propulsion system comprising:

a first pair of tubular members attached by their first ends attached to said gondola, said first pair of tubular members extending through said gasbag and exiting out the top thereof and having propulsion units to their second ends;

a second pair of tubular members attached by their first ends to said gondola, said second pair of tubular members extending into the gasbag and having their second ends terminating therewithin; and a horizontal tubular member extending through said gasbag having its ends extending out of the sides thereof and attached to the opposite ends of said second pair of tubular members in the middle thereof, and further having propulsion units attached to each said second end thereof.

11. The vehicle set forth in claim 10 wherein said propulsion units are rotatably mounted to said second ends of said first pair of tubular members and said ends of said horizontal tubular members.

12. The vehicle as set forth in claim 11 comprising attachment means mounted within said gasbag for securing said first and second pairs of tubular members and said horizontal tubular member to said gasbag, said attachment means comprising:

holes in the external surface of said gasbag through which said first and second tubular members and said horizontal tubular member extends;

an attachment fitting mounted in each of said holes, said attachment fitting comprising:

a hollow tube through which said each one of said first and second pairs of tubular members slidably extends;

attachment fittings for securing said hollow tubular member to the external surface of the gasbag; and seal means mounted in said hollow tube for sealing said tubular member to said hollow tube;

such that the surface of the gasbag can move in relationship to each of said tubular members of said first and second pairs of tubular members.

13. The vehicle as set forth in claim 12 wherein:

said gasbag includes catenary curtains extending from said top of said gasbag to said bottom of said gasbag and attached thereto, said first pairs of tubular members aligned with said catenary curtains;

attachment means for coupling said first pair of tubular members to said catenary curtains;

such that vertical shear loads induced into said catenary curtains by said gondola when the vehicle takes off are at least partially distributed into said first and second pairs of tubular members.

14. The vehicle as set forth in claim 13 wherein:

the catenary curtains include holes therethrough, said propulsion system further comprising:

said horizontal tubular member passing through said holes in said catenary curtains; and attachment means for coupling said horizontal tubular member to said catenary curtains;

such that vertical shear loads induced into said catenary curtains by said gondola when the vehicle takes off are at least partially distributed into said first and second pairs of tubular members.

15. The vehicle as set forth in claim 14 wherein said propulsion units are turbo-prop engines.

16. The vehicle as set forth in claim 10, or 11 or 12, or 13, or 14, or 15, wherein said first pair of tubular members are pivotally attached to said gondola with a pivot axis parallel with the longitudinal axis of the vehicle.

17. The vehicle as set forth in claim 16 wherein said second pair of tubular members are pivotally attached to said gondola by means of a ball joint.

* * * * *